United States Patent
King

(10) Patent No.: US 9,225,183 B2
(45) Date of Patent: Dec. 29, 2015

(54) CHARGING SYSTEM FOR FLEET GOLF

(71) Applicant: Russell W. King, Evans, GA (US)

(72) Inventor: Russell W. King, Evans, GA (US)

(73) Assignee: Club Car, LLC, Evans, GA (US)

( * ) Notice: Subject to any disclaimer, the term of this patent is extended or adjusted under 35 U.S.C. 154(b) by 254 days.

(21) Appl. No.: 13/731,683

(22) Filed: Dec. 31, 2012

(65) Prior Publication Data

US 2013/0181671 A1    Jul. 18, 2013

Related U.S. Application Data

(60) Provisional application No. 61/581,732, filed on Dec. 30, 2011.

(51) Int. Cl.

| | |
|---|---|
| *H02J 7/00* | (2006.01) |
| *B60R 16/02* | (2006.01) |
| *B60L 3/00* | (2006.01) |
| *B60L 3/04* | (2006.01) |
| *B60L 11/18* | (2006.01) |

(52) U.S. Cl.
CPC ............. *H02J 7/0042* (2013.01); *B60L 3/0023* (2013.01); *B60L 3/04* (2013.01); *B60L 11/1816* (2013.01); *B60L 11/1838* (2013.01); *B60R 16/0207* (2013.01); *Y02T 10/7005* (2013.01); *Y02T 90/121* (2013.01); *Y02T 90/128* (2013.01); *Y02T 90/14* (2013.01); *Y02T 90/163* (2013.01); *Y10T 307/74* (2015.04)

(58) Field of Classification Search
CPC H01M 10/48; H01M 16/006; Y02T 10/7005; Y02T 10/7088; Y02T 90/128; Y02T 90/14; Y02T 90/163; Y02T 90/121; Y02T 90/16; B60L 11/1816; B60L 1/1824; B60L 11/1838; B60L 2230/12; B60L 2230/16; B60L 3/104; H02J 2/00; H02J 4/00
USPC ........................................ 320/107, 109, 112
See application file for complete search history.

(56) References Cited

U.S. PATENT DOCUMENTS

| | | |
|---|---|---|
| 4,456,869 A | 6/1984 | Schub |
| 4,700,375 A | 10/1987 | Reed |
| 4,916,438 A | 4/1990 | Collins et al. |
| 5,202,617 A | 4/1993 | Nor |
| 5,206,578 A | 4/1993 | Nor |

(Continued)

OTHER PUBLICATIONS

International Search Report and Written Opinion, PCT/US2012/072302 dated Mar. 7, 2013.

(Continued)

*Primary Examiner* — Vuthe Siek
(74) *Attorney, Agent, or Firm* — Taft Stettinius & Hollister, LLP

(57) ABSTRACT

A charging system is disclosed for charging a battery system of an electric vehicle. In one form, the charging system includes a first connector including a power control unit that is operable to selectively supply charging power from a power source. A second connector is connected with the first connector and includes a fault detection circuit. A controller is connected with the fault detection circuit and the power control unit. The controller is operable to control the power control unit to selectively supply charging power to a battery system if a fault is not detected from fault detection circuit. A cordset for use with the charging system is also disclosed that allows the cordset to perform certain electrical functions and connect the cordset to a connector of the vehicle in a breakaway manner.

14 Claims, 4 Drawing Sheets

(56) References Cited

U.S. PATENT DOCUMENTS

| | | |
|---|---|---|
| 5,385,480 A | 1/1995 | Hoffman |
| 5,548,200 A | 8/1996 | Nor et al. |
| 5,757,595 A | 5/1998 | Ozawa et al. |
| 5,926,004 A | 7/1999 | Henze |
| 6,114,833 A | 9/2000 | Langston et al. |
| 6,157,162 A | 12/2000 | Hayashi et al. |
| 6,225,776 B1 | 5/2001 | Chai |
| 6,630,813 B2 | 10/2003 | Berels et al. |
| 2004/0169489 A1 | 9/2004 | Hobbs |
| 2004/0226801 A1 | 11/2004 | De Jonge et al. |
| 2007/0212596 A1 | 9/2007 | Nebrigic et al. |
| 2007/0278991 A1 | 12/2007 | Miyata |
| 2008/0150490 A1 | 6/2008 | Koziara et al. |
| 2008/0203995 A1* | 8/2008 | Carrier et al. .............. 323/351 |
| 2008/0303480 A1 | 12/2008 | Prutchi et al. |
| 2009/0107740 A1 | 4/2009 | Bell et al. |
| 2010/0019718 A1 | 1/2010 | Salasoo et al. |
| 2010/0026477 A1 | 2/2010 | Reynolds et al. |
| 2010/0114798 A1 | 5/2010 | Sirton |
| 2010/0245095 A1 | 9/2010 | Harrell |
| 2010/0320964 A1 | 12/2010 | Lathrop et al. |
| 2011/0025267 A1 | 2/2011 | Kamen et al. |
| 2011/0074351 A1* | 3/2011 | Bianco et al. .............. 320/109 |
| 2011/0077809 A1 | 3/2011 | Leary |
| 2011/0089760 A1* | 4/2011 | Castelaz et al. .............. 307/25 |
| 2011/0175569 A1 | 7/2011 | Austin |

OTHER PUBLICATIONS

SAE International Technical Report, Surface Vehicle Recommended Practice, SAE Electric Vehicle and Plug in Hybrid Electric Vehicle Conductive Charge Coupler, J1772 Jan. 2010, Superseding J1772 Nov. 2001, Issued Oct. 1996, revised Jan. 2010, 51 pages.

FCI MVL Division, Brochure, Power.S3, EV-Plug-16/32A, Charge plug 16/32A as per SAE-J1772 & IEC-62196-2-1, 2010, 34 pages.

International Search Report of the International Searching Authority for International PCT Application No. PCT/US2012/072303; Mar. 5, 2013; 2 pages.

Written Opinion of the International Searching Authority for International PCT Application No. PCT/US2012/072303; Mar. 5, 2013; 8 pages.

\* cited by examiner

CHARGING SYSTEM FOR FLEET GOLF

PRIORITY

This application claims priority to and the benefit of U.S. Provisional Application No. 61/581,732 filed on Dec. 30, 2011.

BACKGROUND

Electric vehicles, such as golf carts for example, were traditionally used in specific settings such as factories or golf courses which would maintain the vehicles and could afford to purchase them. Energy efficiency is now a key issue in society due somewhat to the increasing costs associated with traditional fuels. Over the past several years, some new electric vehicles, also referred to as Neighborhood Electric Vehicles ("NEVs"), have gained in popularity. These vehicles are specifically designed for individuals to use as an alternative to fuel powered vehicles. A need exists for a safe and efficient manner to charge these types of vehicles that are normally used by average people not trained to work with and maintain these types of vehicles.

SUMMARY

One embodiment of the present application is a unique charging system for electric vehicles. Another embodiment is a cordset for use with a charging system. Other embodiments include methods, systems, apparatuses, devises, hardware and combinations for charging systems for electric vehicles. Further embodiments, forms, features, aspects, benefits and advantages of the present application will become apparent from the description and figures provided herewith.

BRIEF DESCRIPTION OF THE DRAWINGS

The description herein makes reference to the accompanying drawings wherein like reference numeral refer to like parts throughout several views and wherein.

DETAILED DESCRIPTION

Figure 1:
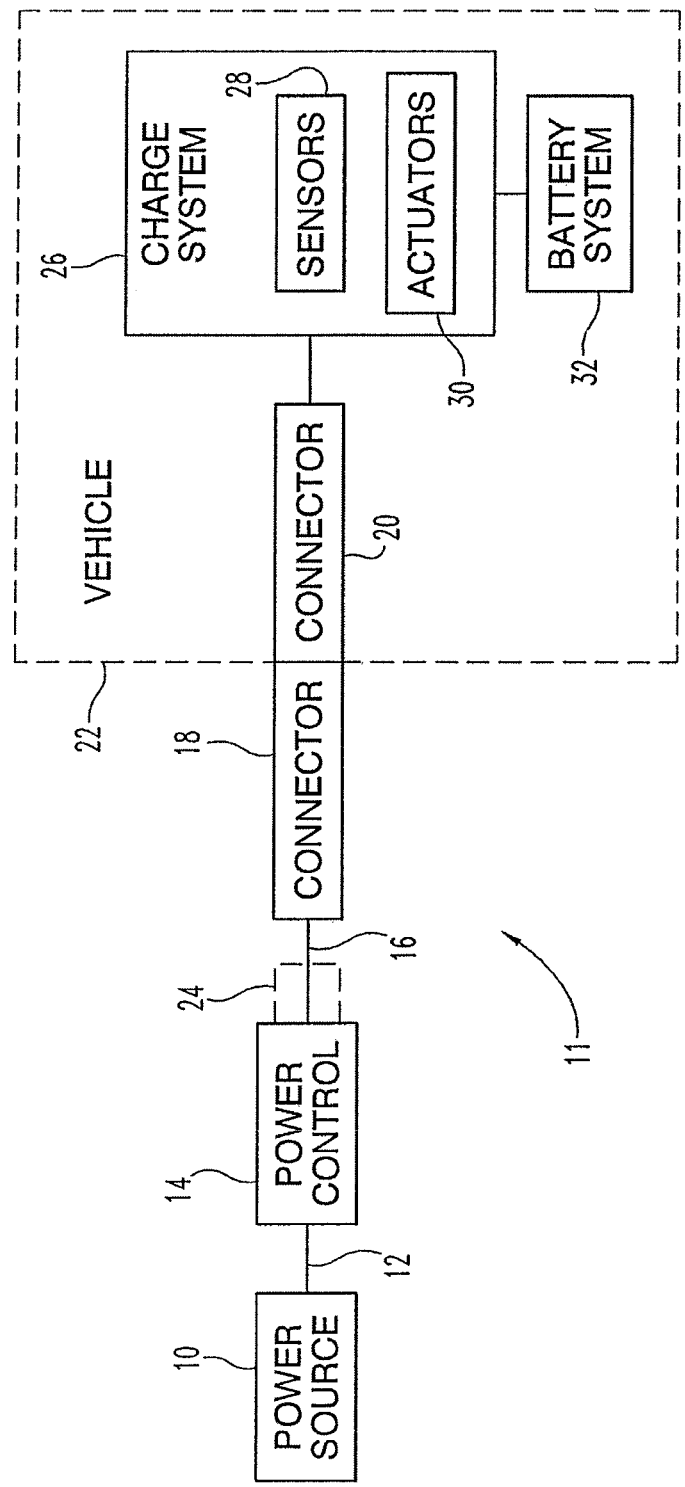
FIG. 1 is a block diagram of a charging system according to an embodiment.

FIG. 1 is a block diagram of a charging system according to an embodiment. In this embodiment, a vehicle 22 is coupled to a power source 10 by a cordset 11. The vehicle 22 can be any variety of vehicle. For example, the vehicle can include a golf car, utility vehicle, passenger vehicle, or the like.

The vehicle 22 can be coupled to the power source 10 for charging an onboard battery system 32. For example, the vehicle 22 can include a battery system 32 configured to provide electrical power for the vehicle 22. Although in an embodiment, the battery system 32 can be the sole source of energy for the vehicle 22, in another embodiment, the vehicle 22 can include other power sources, such as an internal combustion engine in a hybrid vehicle.

The cordset 11 can include a cable 12, power control 14, a cable 16, and a connector 18. The cable 12 can couple the power source 10 to the power control 14. For example, the cable 12 can include a plug, such as a National Electrical Manufacturers Association (NEMA) 5-15P plug or the like. The power source 10 can include a corresponding receptacle. Accordingly, the cable 16 can be plugged into the power source 10.

In another embodiment, the power source 10 can be connected to the power control 14 without connectors. For example the power control 14 can be installed in a wall box or other suitable housing and coupled to the power source 10. The cable 16 and connector 18 can be exposed to a user to be coupled to a vehicle 22.

The power source 10 can be any variety of power source. For example, the power source 10 can be an alternating current (AC) power source. However, in other embodiments, the power source 10 can be a direct current (DC) power source.

The power control 14 is configured to control whether power is delivered from the power source 12 to the vehicle 22. As will be described in further detail below, the power control 14 can include switches, relays, actuators, other circuitry, or the like. The power control 14 can include switching of the power supply; however, other processing of the power can occur. For example, filtering, surge protection, rectification, or the like can occur in the power control 14.

The vehicle 22 can include a connector 20. The connector 20 can be coupled to an on-board charge system 26 of the vehicle 22. Accordingly, the battery system 32 of the vehicle 22 can be charged through the cordset 11.

The charge system 26 can be configured to control charging of the battery system 32. The charge system 26 can include sensors 28, actuators 30, or the like. Examples of the sensors 28 and actuators 30 will be described in further detail below.

In an embodiment, the cable 16 can be coupled to the power control 14 through a breakaway connection 24. For example, when multiple vehicles 22 are charging near each other, the cables 16 of the vehicles 22 can become tangled with other vehicles 22. A user may drive the vehicle 22 while the cable 16 is still attached to both the vehicle 22 and the power control 14. The breakaway connection 24 can be configured to release under such circumstances. For example, the breakaway connection 24 can be a modified connector with additional retention, such as a clamp, collar, compression device, or the like, that results in an additional amount of force to remove the connector. Such force can be below an amount that would damage the cable 16, power control 14, or the like, yet still be removable.

Figure 2:
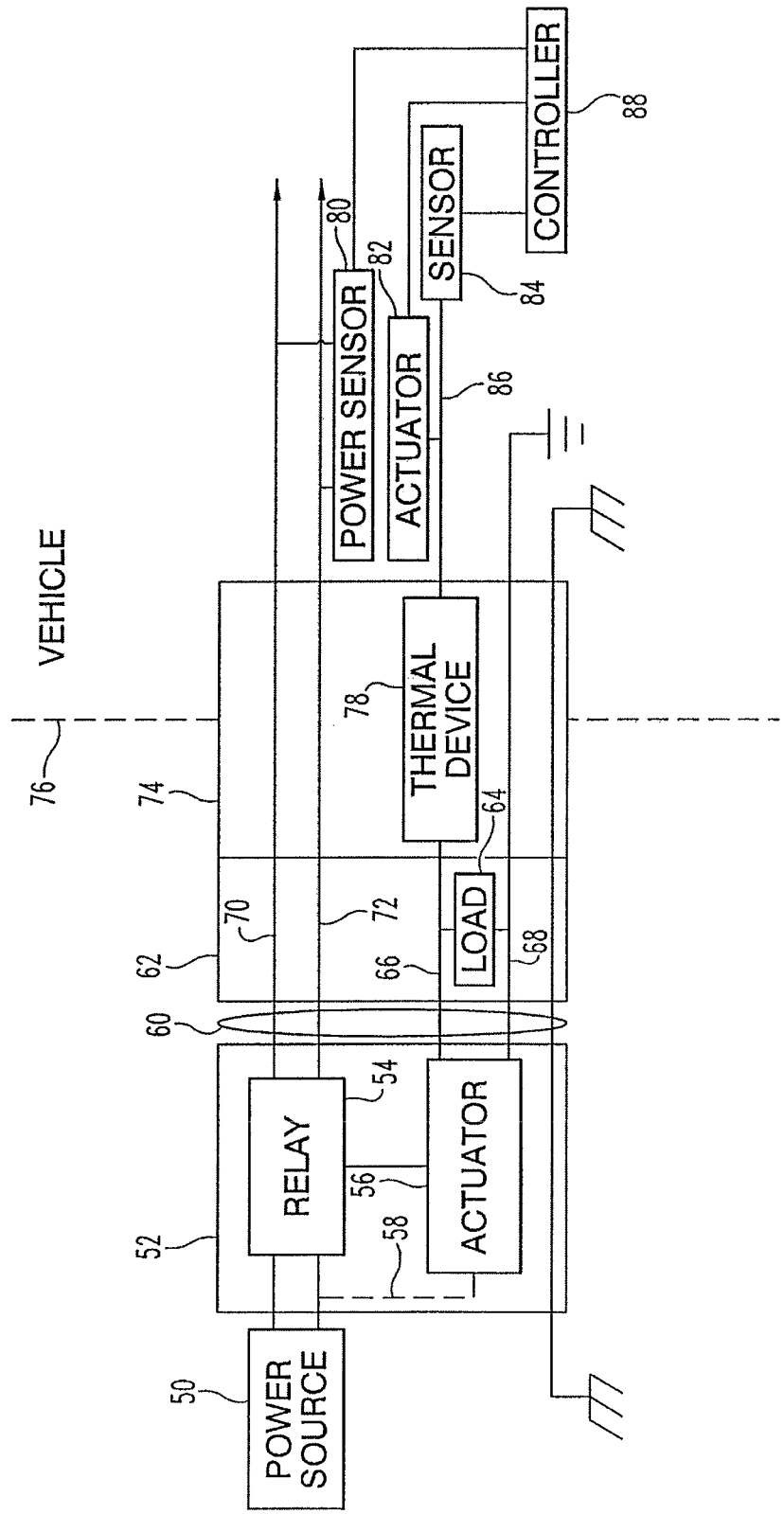
FIG. 2 is a block diagram of a charging system according to another embodiment.

FIG. 2 is a block diagram of a charging system according to another embodiment. In this embodiment, the power source 50 is coupled to the plug 62 through a relay 54. The relay 54 can be configured to selectively connect the conductors of the power source 50 with conductors 70 and 72 passing through the plug 62 and receptacle 74. Here, the plug 62 and receptacle 74 can be the connectors 18 and 20 described above. Although the plug 62 and receptacle 74 will be used as an example, the connectors 18 and 20 can be any variety of connectors, different genders, genderless connectors, or the like.

The power control 52 can include an actuator 56 configured to control actuation of the relay 54. In an embodiment, the actuator 56 can be powered solely through the conductors 66 and 68 passing through the plug 62 and receptacle 74. However, in another embodiment, the actuator 56 can be coupled to the power source 50 through connection 58. The control of the actuator 56 can still be provided through the plug 62 and receptacle 74.

Cable 60 couples the power control 52 to the plug 62. In particular, the cable 60 includes conductors for both power transfer and actuator control. For example, power can be supplied through conductors 70 and 72. Control of the actuator 56 can be performed through the conductors 66 and 68. Although a particular number of conductors for the power transfer and actuator control have been described, any number of conductors can be present as desired. For example, the supplied power can be three-phase power with three power conductors and a ground conductor. In another example, the power connection and actuator control can include a common conductor, such as a common ground.

In an embodiment, a load 64 can be coupled to the conductors 66 and 68 that are coupled to the actuator 56. The load 64 can be disposed in the plug 62. The load 64 can be any variety of devices. For example, the load 64 can include one or more electrical components, such as resistors, capacitors, inductors, active components, or the like. In a particular embodiment, the load 68 can be a device that can be sensed by the controller 88 through the sensor 84.

Although a resistor will be used as an example, other components can be used, depending on what signal is used to actuate the actuator 56. For example, any component or circuit that can induce a measureable difference when the plug 62 and receptacle 74 are connected can be used as the load 68.

In an embodiment, a thermal device 78 can be disposed in the receptacle 74. The thermal device 78 can be configured to have an electrical parameter that changes based on temperature. For example, the thermal device 78 can be a thermistor. In another example, the thermal device 78 can be a resettable fuse or polymeric positive temperature coefficient device. In these examples, as temperature changes, a resistance of the thermal device 78 changes.

In an embodiment, the controller 88 can be coupled to a power sensor 80, an actuator 82, and a sensor 84. The power sensor 80 can be configured to sense if power is supplied through the receptacle 74. The actuator 82 can be configured to actuate the actuator 56. The actuator 82 can also be configured to apply a stimulus, bias, or the like to the conductor 86. The sensor 84 can be configured to sense a voltage on the conductor 86. However, in other embodiments, the sensor 84 can be configured to sense a current supplied to the conductor 86.

As illustrated, the actuator 56 and vehicle share a common ground represented by conductor 68. However, in another embodiment, a terminal of the actuator 56 need not include a ground. For example, the actuator 56 can be drive differentially. The load 64 can still be placed in parallel with the actuator 56. In such circumstances, a separate ground connection can, but need not be made through the plug 62 and receptacle 74 interface.

Figure 3:
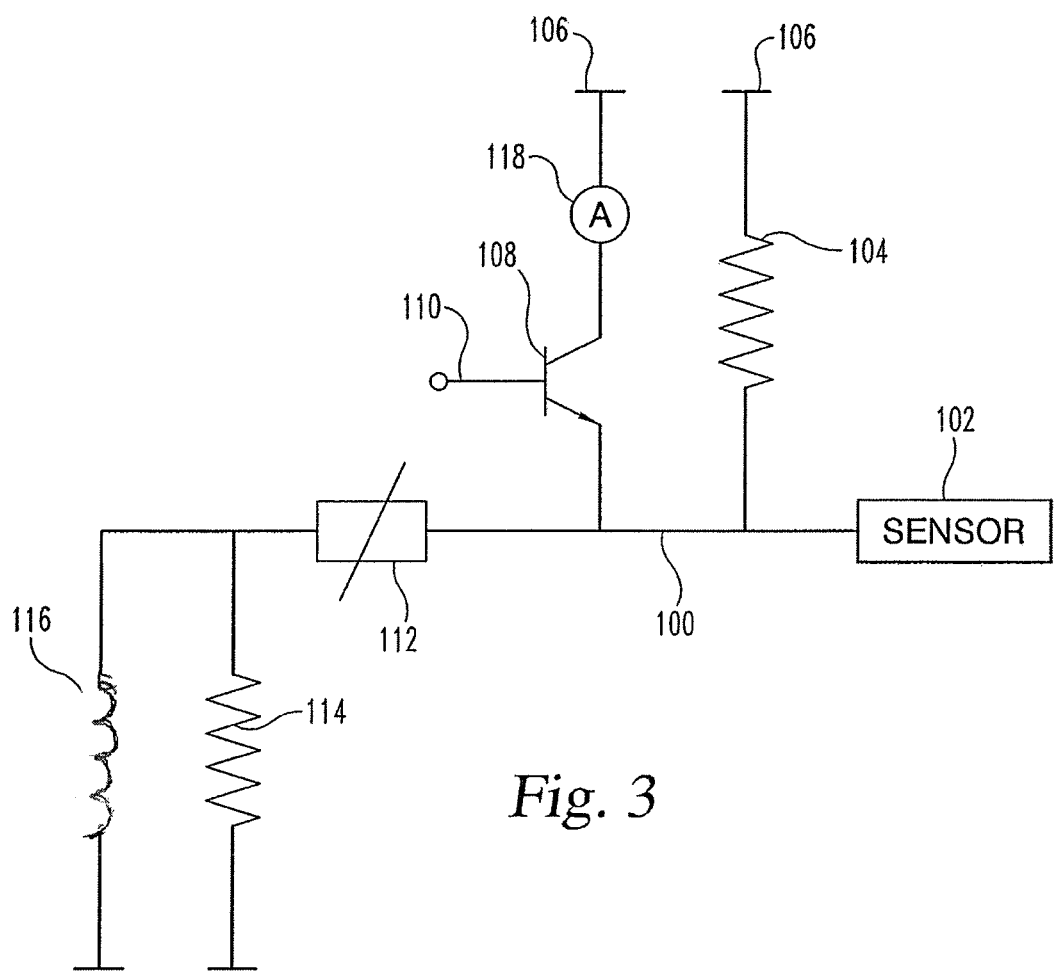
FIG. 3 is a circuit diagram of a charging system according to an embodiment.

FIG. 3 is a circuit diagram of a charging system according to an embodiment. Referring to FIGS. 2 and 3, in this embodiment, the inductor 116 represents an actuator of a relay 54. For example, the inductor 116 can be part of the relay 54. In another example, the inductor 116 can be part of the actuator 56. Resistor 114 represents the load 68. Thermistor 112 represents the thermal device 78. Transistor 108 and resistor 104 can represent the actuator 82. Voltage sensor 102 can represent the sensor 84. The resistor 104 is coupled between the node 100 and a power supply 106.

Similarly, transistor 108 is coupled between node 100 and the power supply 106. A current sensor 118 can be configured to sense a current through the transistor 108. Although the current sensor 118 is illustrated as sensing a collector current of the transistor 108, the current sensor 118 can be configured to sense any current corresponding to the current supplied to the node 100. Furthermore, although a bipolar transistor has been illustrated, any switching device can be used, including other transistor types, relays, or the like.

Before a plug 62 and receptacle 74 are mated, the inductor 116 (i.e., relay 54 or actuator 56) and the resistor 114 (i.e., load 64) are not coupled to the thermistor 112 (i.e., thermal device 78). At this point, the control input 110 can be supplied to turn off the transistor 108. Accordingly, the node 100 is pulled up to the power supply voltage 106. This voltage can represent a disconnected state.

Once the plug 62 and receptacle 74 are mated, the resistor 114 and inductor 116 are electrically connected to the node 100. Thus, the voltage divider formed will create a new voltage on node 100. This voltage can correspond to a connected state. In other words, a node that can be used to actuate the actuator 56 can also be used to determine a state, faults, or the like.

For example, various failures can be detected through the voltage on the node 100. If the inductor 116 is shorted, the voltage will be pulled to a lower voltage. If the inductor 116 is open, the node 100 will be pulled to a higher voltage. Similarly, if the resistance of the thermistor 112 changes due to a high temperature, the voltage on node 100 can correspondingly change. Component values can be selected such that the voltages on node 100 during these various conditions are sufficiently different to be distinguishable by the sensor 102. Accordingly, the voltage can be used by the controller 88 to determine a variety of faults before actuating the relay 54.

In an embodiment, to actuate the actuator 56, the control signal 110 can turn on the transistor 108. Accordingly, the node 100 can be pulled to about the supply voltage 106. This can energize the inductor 116 and hence, actuate the relay 54. In an embodiment, during operation, the transistor 108 can be periodically turned off, allowing node 100 to return to a voltage that can be used to determine if a fault has occurred as described above.

In another embodiment, the current sensor 118 can be used to determine if a fault has occurred. For example, in normal operation, a particular current will be flowing through the transistor 108. If the plug 62 is disconnected, the current can change, for example, to a lower value, since the resistor 114 and inductor 116 are no longer in the circuit. If the cable 60 has pulled away from the power control 52 or the inductor 116 has failed as an open, the current can again change, but to a different value as the resistor 114 in the plug 62 is still connected.

In an embodiment, changes in the resistance of the thermistor 112 can be reflected in the sensed current. For example, the thermistor 112 can be a positive temperature coefficient thermistor. As temperature increases in the receptacle, the resistance can increase, causing a decrease in the current, decrease in voltage across the inductor 116, or the like. Eventually, the resistance can increase sufficiently such that the inductor 116 is no longer sufficiently energized to maintain an actuation of the relay 54.

In this embodiment, the thermistor 112 can have multiple purposes. That is, the current can change, giving an indication of the temperature in the receptacle. In addition, the thermistor 112 can cause the power supply to be turned off due to a thermal overload.

Although a thermistor 112 with a linear and/or substantially continuous resistance versus temperature has been described, other components can be used. For example, a resettable fuse can perform a similar thermal shutdown function. Furthermore, a combination of such devices can be used. For example, a thermistor can be used in series with a resettable fuse to achieve a level of detail below a shutdown threshold temperature and a larger resistance change when a thermal shutdown is desired.

As described above, a power sensor 80 can be present. The controller 88 can be configured to receive the outputs of the various sensors, such as the power sensor 80 and sensor 84, and use the outputs, in combination or individually, to monitor and control the supply of power, connection state, component status, or the like. For example, if the controller 88 receives a signal of a substantial increase in power from the power sensor 80, the controller 88 can cause the actuator 56 to open the relay 54 thereby disconnecting the charge system 28 from the power source 50 so that the charging system is turned off.

In an embodiment, the controller 88 can be the controller for the actuator 56. That is, the power control 52 can effectively be a passive device. The vehicle 76 can include the circuitry configured to drive the actuator 56.

Moreover, in an embodiment, communication between the vehicle 76 and the power control 52 need not occur. Accordingly, the design of the power control 52 can be simplified. Communication interfaces, decoders, microprocessors, or the like involved in communication, maintain status information, monitoring or the like need not be included in the power control 52.

In an embodiment, as selection of the value of the resistor 114 can be used to indicate a type of power source 50. For example, if the power source 50 is a three-phase AC source, the resistor 114 can have a first value. If the power source 50 is a DC source, the resistor 114 can have a second value. If the power source 50 is a single phase AC source, the resistor 114 can have a third value. Any number of values can be selected to correspond to different power sources. The values can be selected such that the voltages on node 100 resulting from the different values can still be distinguished from the various failure conditions described above.

As described above, before the control input 110 is actuated to actuate the inductor 116, the voltage of node 100 can be sensed. The controller 88 can be configured to use this sensed voltage to configure the charging system 26 to accept the power provided by the corresponding power source. That is, the charging system 26 can automatically reconfigure for different power sources.

Although relative DC voltages and/or currents have been used as examples of parameters for determining connections, faults, or the like, other signal parameters can be used. For example, amplitude and/or phase of an AC signal can be used. Furthermore, although particular voltage polarities, levels, or the like have been used, different polarities, levels, or the like can be used as desired.

In an embodiment, a substantially reduced number of components and thus, a reduced cost and complexity can be achieved. For example, the circuit of FIG. 3 can achieve fault detection, connection detection, actuator control, and the like with a small number of components.

Figure 4:
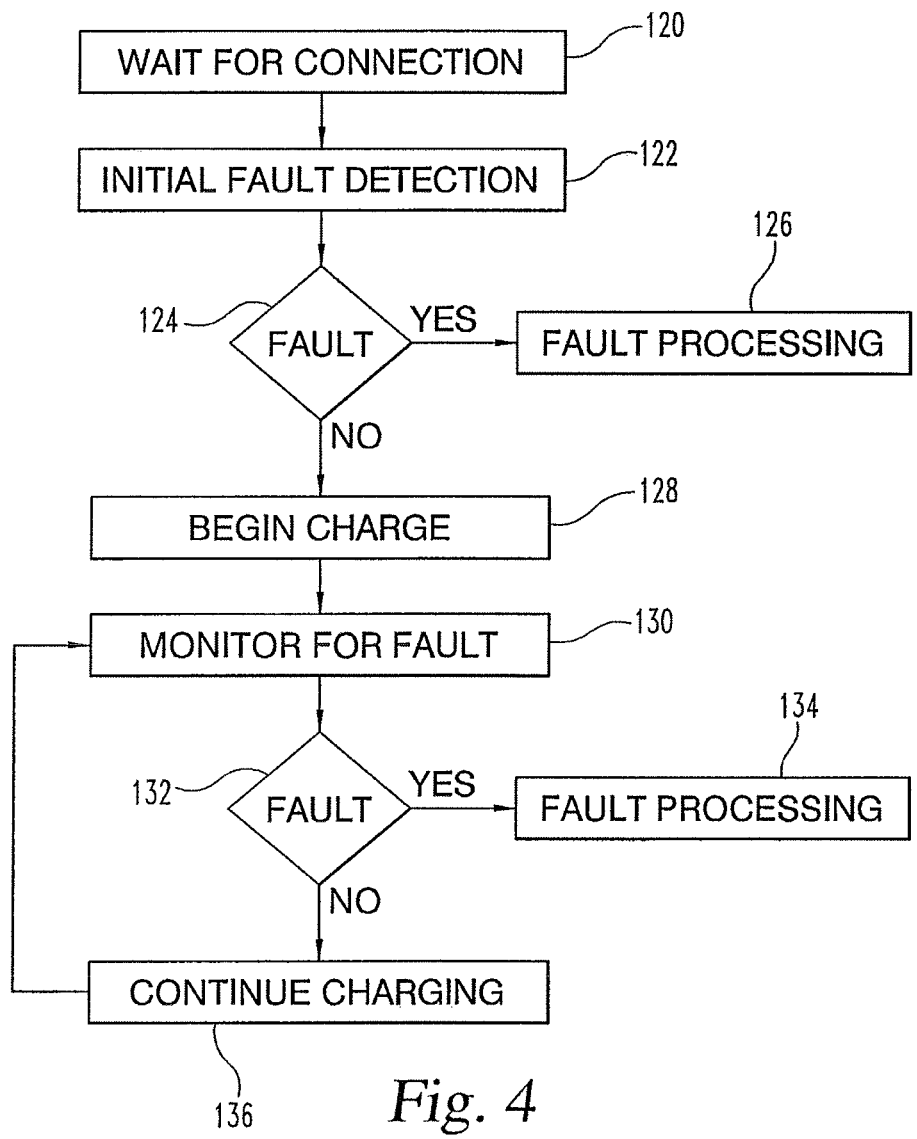
FIG. 4 is a flowchart illustrating operations of a charging system according to an embodiment.

FIG. 4 is a flowchart illustrating operations of a charging system according to an embodiment. In this embodiment, the controller 88 can wait for a connection in 120. For example, the voltage of node 100 can be monitored for a change indicating the load 64 has been electrically connected to the node 100.

In 122, initial fault detection can be performed. For example, using the voltage of the node 100, a determination can be made to determine if a device is shorted, open, thermally overloaded, or the like. If so, corresponding fault processing can occur in 126, such as preventing charging, setting an error flag, or the like.

Assuming that no faults are determined in 124, charging can begin in 128. As described above, the actuator 56 can be actuated to close the contacts of the relay 54. However, in another embodiment, other functions can be performed. For example, the charge system can be reconfigured for a particular power source 50. In another example, a status of the battery 32 can be determined. Any such functions related to charging can be performed.

Once charging begins, in 130 the system can be monitored for a fault. As described above, various currents and/or voltages can be used to sense a fault condition. If a condition is determined in 132, fault processing can occur in 134, such as deactivating the relay 54, preventing charging for a time period, requiring a manual reset, or the like. If no fault is detected, the charging can continue in 136 and further fault monitoring can occur in 130.

An embodiment includes a computer-readable medium storing computer-readable code that when executed on a computer, causes the computer to perform the various techniques described above.

Although particular sequences of operations have been described above, in other embodiments, the sequences can occur as desired.

Although particular embodiments have been described above, the scope of the following claims is not limited to these embodiments. Various modifications, changes, combinations, substitution of equivalents, or the like can be made within the scope of the following claims.

The invention claimed is:

1. A charging system, comprising:
   a first connector including a power control unit that is operable to selectively supply power from a power source;
   a second connector connected with said first connector, wherein said second connector includes a fault detection circuit with a thermal device disposed therein;
   a controller connected with said fault detection circuit and said power control unit, wherein said controller is operable to control said power control unit to selectively supply charging power to a battery system if a fault is not detected from said fault detection circuit; and
   a sensor connected between said fault detection circuit and said controller, wherein said sensor is operable to generate a signal that is sent to said controller if said fault is detected because of a change in an electrical parameter generated by said thermal device.

2. The charging system of claim 1, wherein said first connector is connected with said second connector via a breakaway connection.

3. The charging system of claim 1, wherein said power control unit comprises a relay connected with said power source, wherein a first actuator is connected with said relay and said control unit, wherein said control unit is operable to activate said actuator such that said relay provides power from said power source if said fault is not detected.

4. The charging system of claim 1, wherein said second connector comprises a connector external of a vehicle and an internal connector located within said vehicle, wherein said connector external of said vehicle is operable to connect with said internal connector located within said vehicle.

5. The charging system of claim 1, wherein said fault detection circuit comprises a predetermined load, wherein upon detection of a change in an electrical parameter of said predetermined load a fault signal is sent to said controller.

6. The charging system of claim 1, further comprising an actuator connected between said controller and said power control unit for controlling operation of said power control unit.

7. The charging system of claim 6, wherein said actuator comprises a switching device having an input coupled to said controller, wherein said controller is configured to generate a signal that is sent to said power control unit to selectively supply charging power to said battery system if said fault is not detected from said fault detection circuit.

8. The charging system of claim 7, wherein said switching device comprises a transistor.

9. A charging system, comprising:
a switching device including an actuator positioned within a first connector;
a second connector configured to be coupled to said first connector; and
a controller configured to be coupled to said actuator when said first connector and second connector are mated;
wherein:
said controller is configured to actuate said actuator through said first connector and second connector thereby providing a charging voltage to a battery system;
a fault detection circuit connected between said switching device and said controller, wherein said fault detection circuit is operable to cause said controller to deactivate said switching device if a fault is detected;
wherein said fault detection circuit comprises a thermal device; and
a sensor connected between said fault detection device and said controller, wherein said sensor is operable to generate a signal that is sent to said controller if said fault is detected because of a change in an electrical parameter generated by said thermal device.

10. The charging system of claim 9, wherein said switching device includes a relay connected with said actuator, wherein said actuator is operable to activate said relay when said first connector is coupled to said second connector.

11. A charging system, comprising:
a switching device including an actuator positioned within a first connector;
a second connector configured to be coupled to said first connector; and
a controller configured to be coupled to said actuator when said first connector and second connector are mated;
wherein:
said controller is configured to actuate said actuator through said first connector and second connector thereby providing a charging voltage to a battery system;
a fault detection circuit connected between said switching device and said controller, wherein said fault detection circuit is operable to cause said controller to deactivate said switching device if a fault is detected;
wherein said fault detection circuit comprises a predetermined load; and
a sensor connected between said fault detection device and said controller, wherein said sensor is operable to generate a signal that is sent to said controller if said fault is detected because of a change in an electrical parameter generated by said load.

12. A cordset, comprising:
a power control unit operably connectable to a power source, wherein said power control unit includes a switching device operable for selectively providing power to an output of said power control unit;
a cord electrically connecting said output of said power control unit to a connector, wherein said connector includes a load coupled to said switching device of said power control unit by said cord;
a thermal device in electrical communication with said connector operable to generate an electrical parameter;
a sensor operable to generate a signal fault upon a change in the electrical parameter generated by said thermal device; and
wherein:
an actuator of said switching device is coupled to said load through the cord; and
said switching device is configured to switch power from a power source to said connector in response to activation of said actuator and shut off power to said connector when the sensor generates a signal fault.

13. The cordset of claim 12, wherein said load is in parallel with said actuator.

14. The cordset of claim 12, wherein said power control unit is connected with said cord via a breakaway connection.

* * * * *